March 18, 1924. 1,487,367
H. M. WILLIAMS ET AL
WEED BURNER
Filed June 28, 1919 12 Sheets-Sheet 2

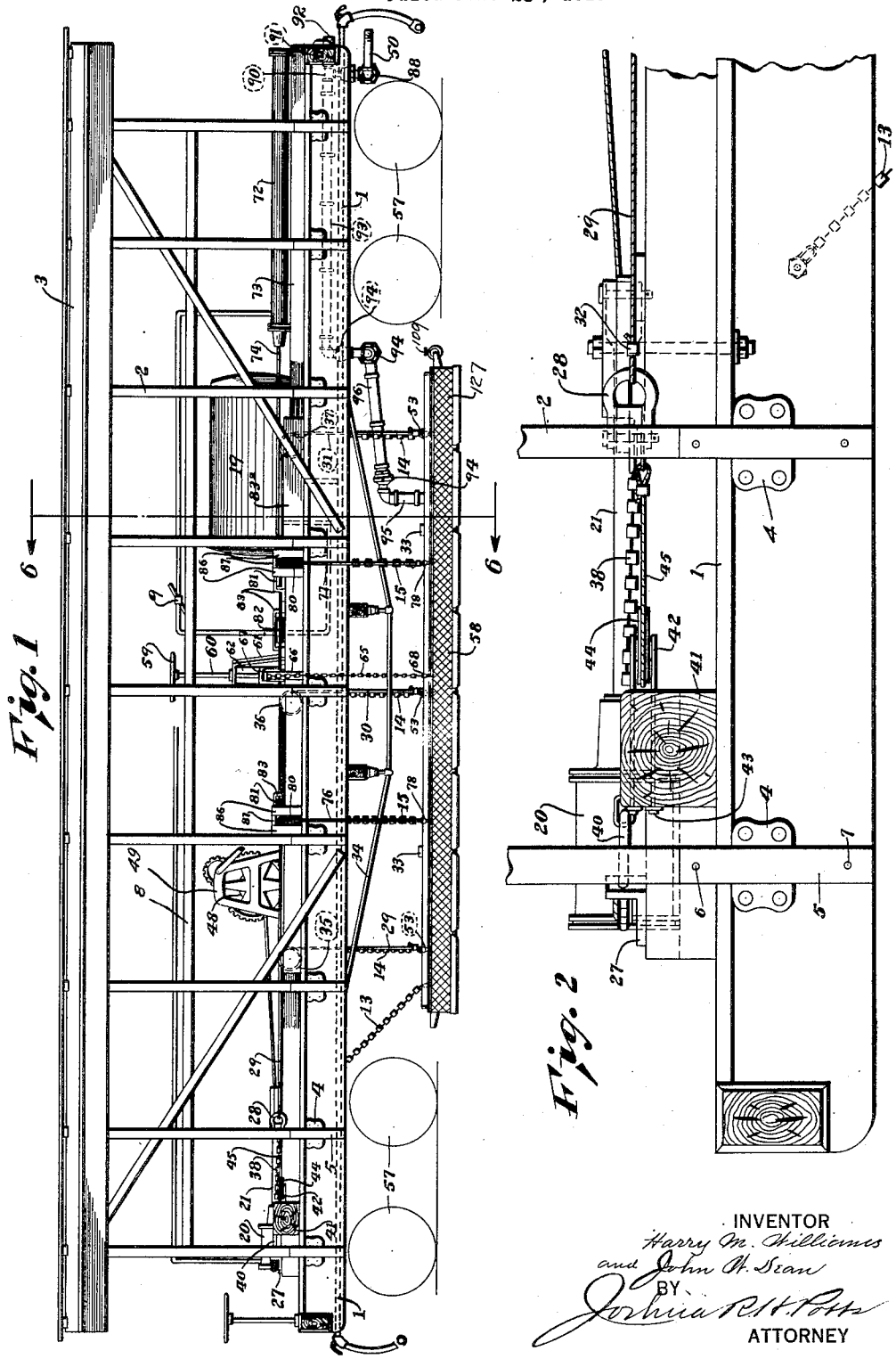

INVENTOR
Harry M. Williams
and John W. Dean,
BY
ATTORNEY

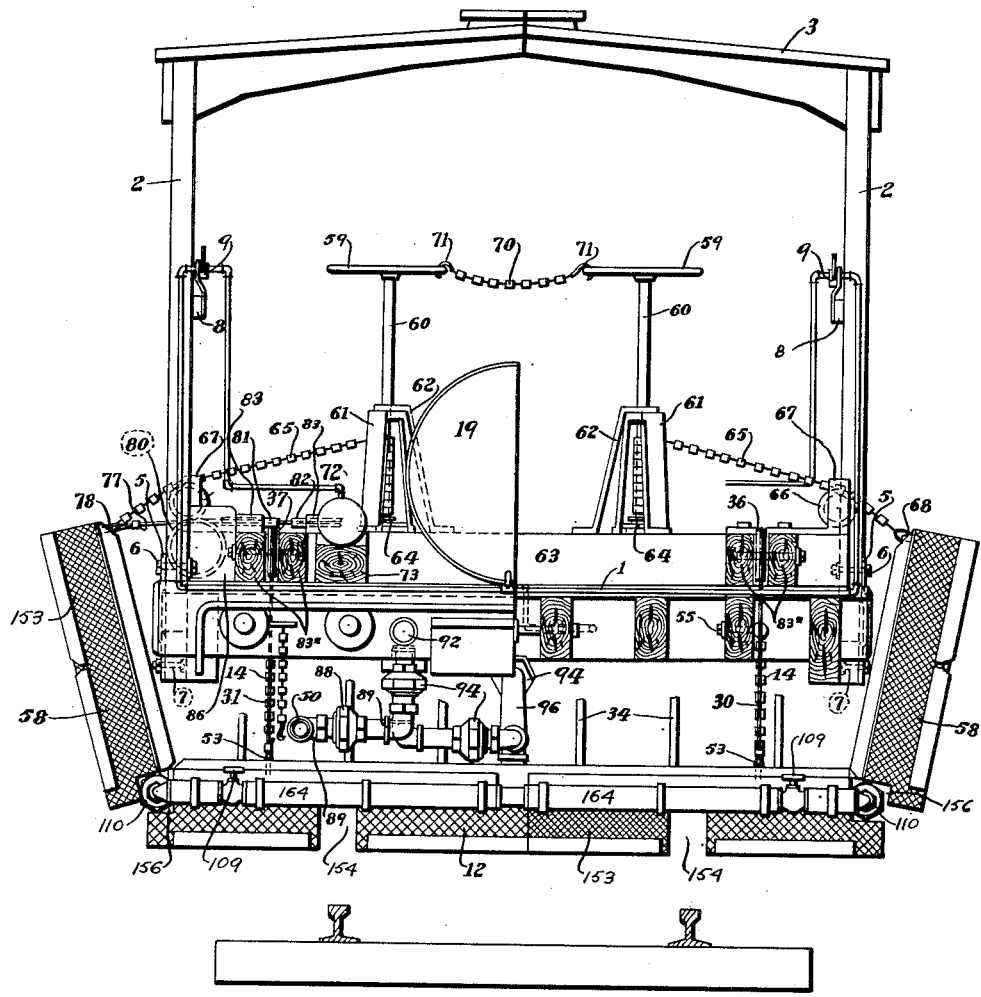

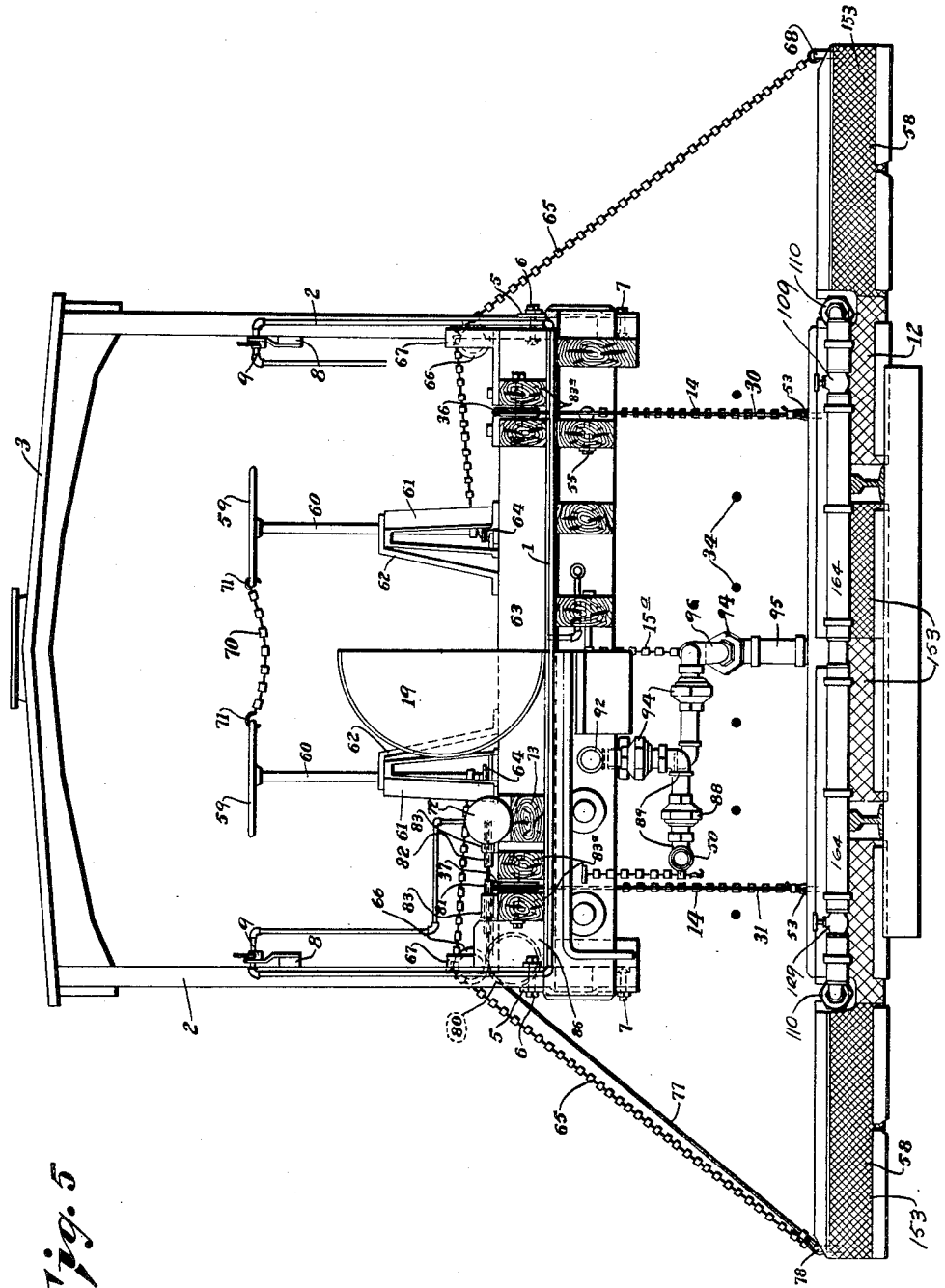

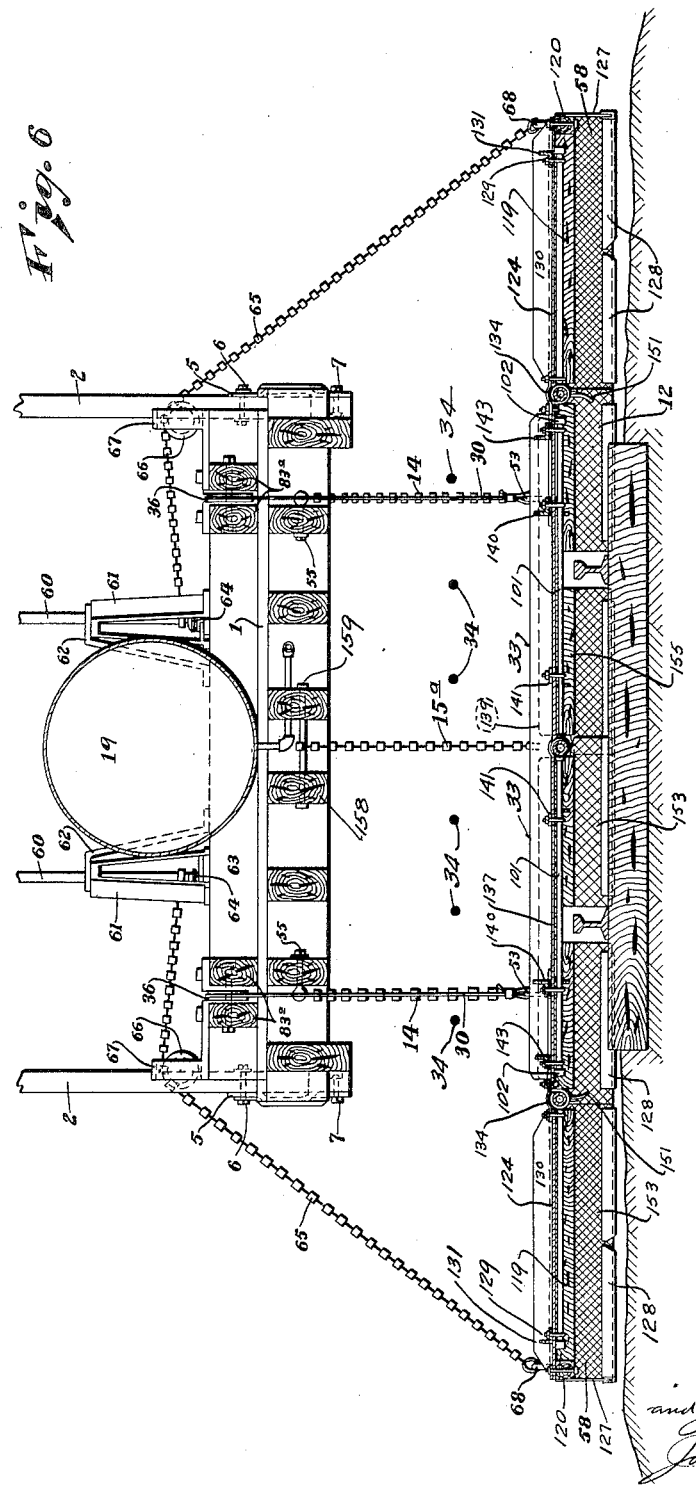

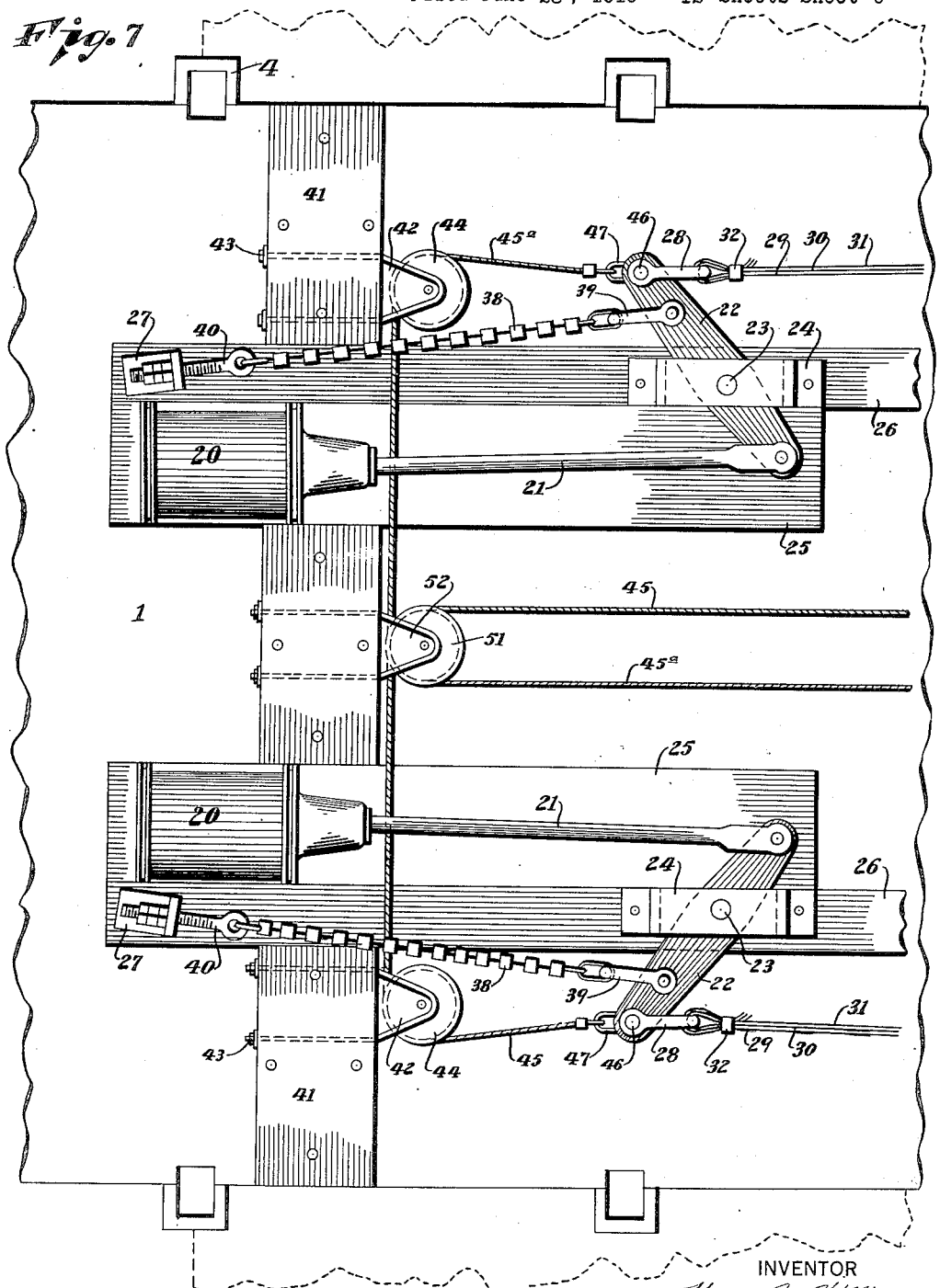

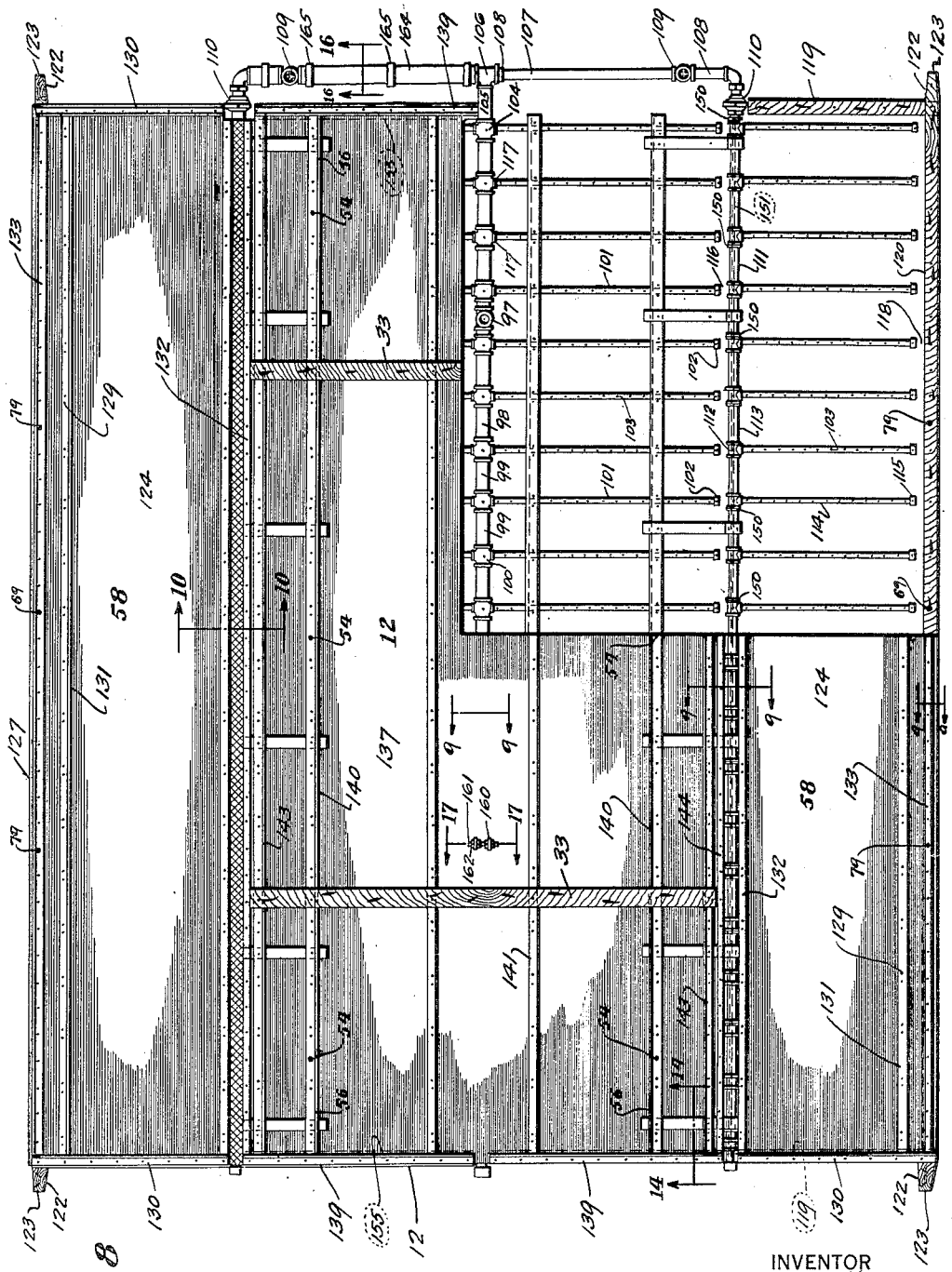

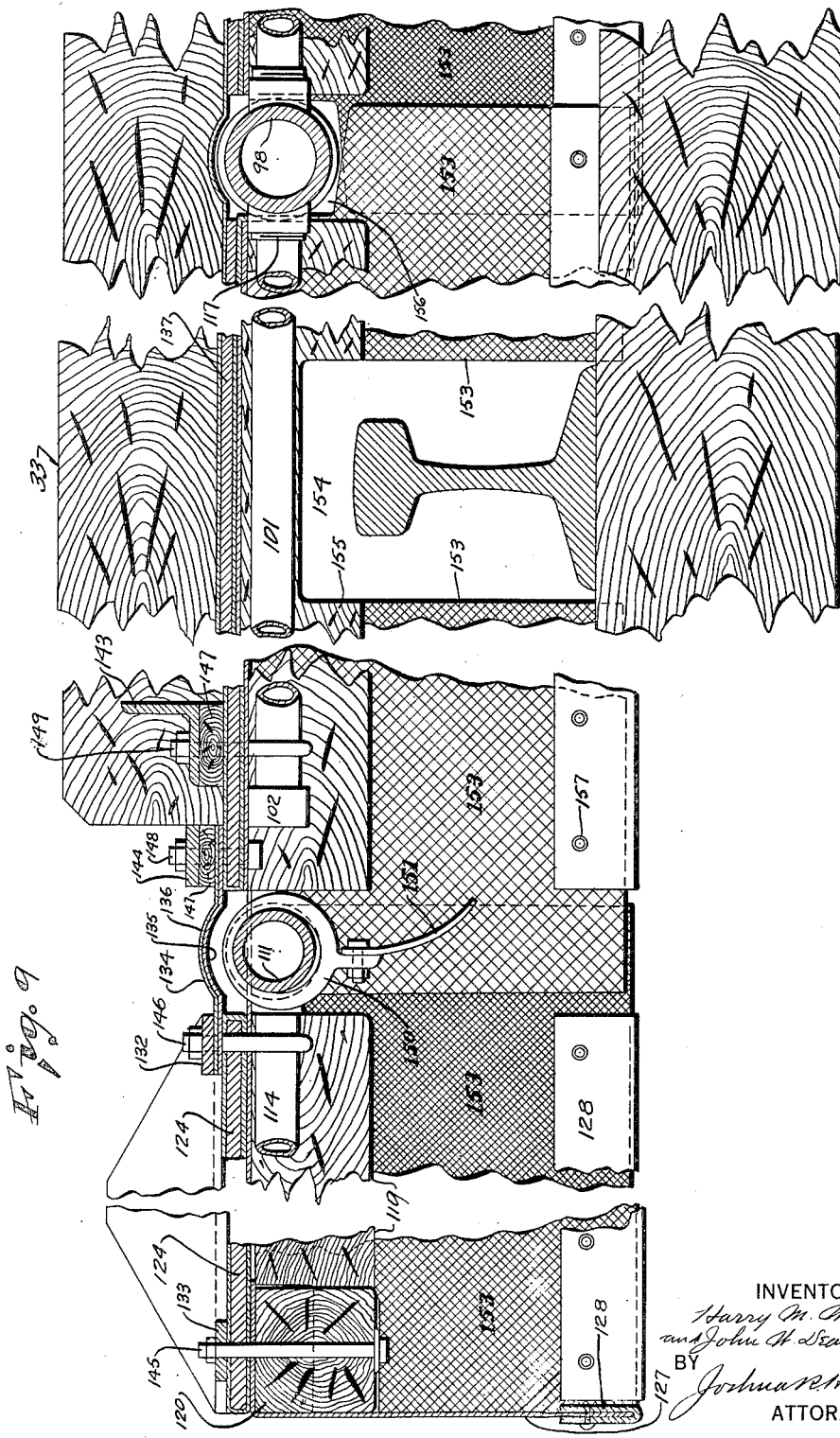

March 18, 1924. 1,487,367
H. M. WILLIAMS ET AL
WEED BURNER
Filed June 28, 1919 12 Sheets-Sheet 9
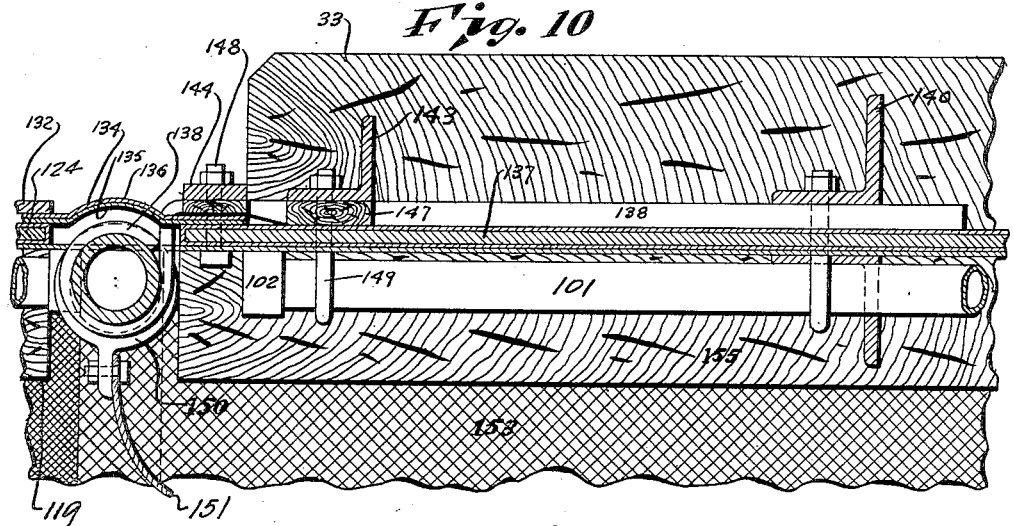
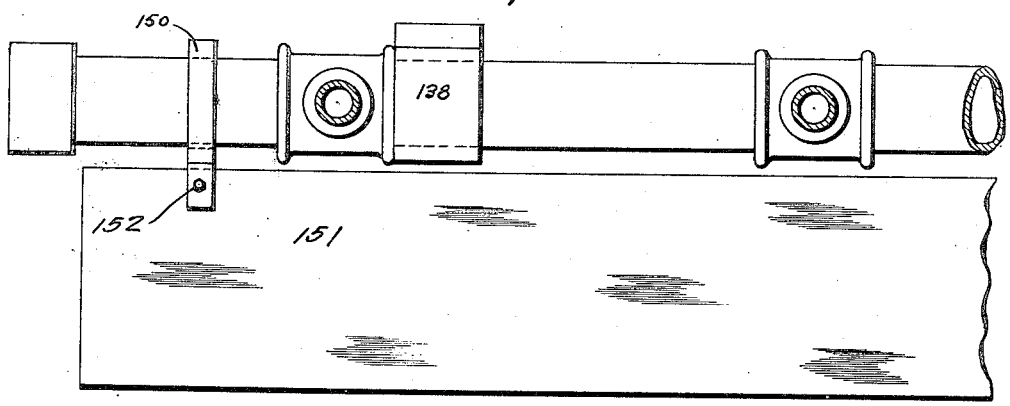
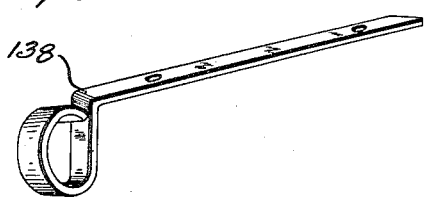
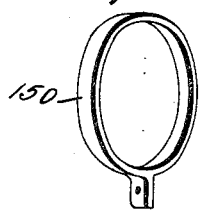
INVENTOR
Harry M. Williams
and John H. Dean
BY
Joshua R H Potts
ATTORNEY March 18, 1924.

H. M. WILLIAMS ET AL

WEED BURNER

Filed June 28, 1919    12 Sheets-Sheet 10

INVENTOR
Harry M. Williams
and John H. Dean,
BY
Joshua R. H. Potts
ATTORNEY

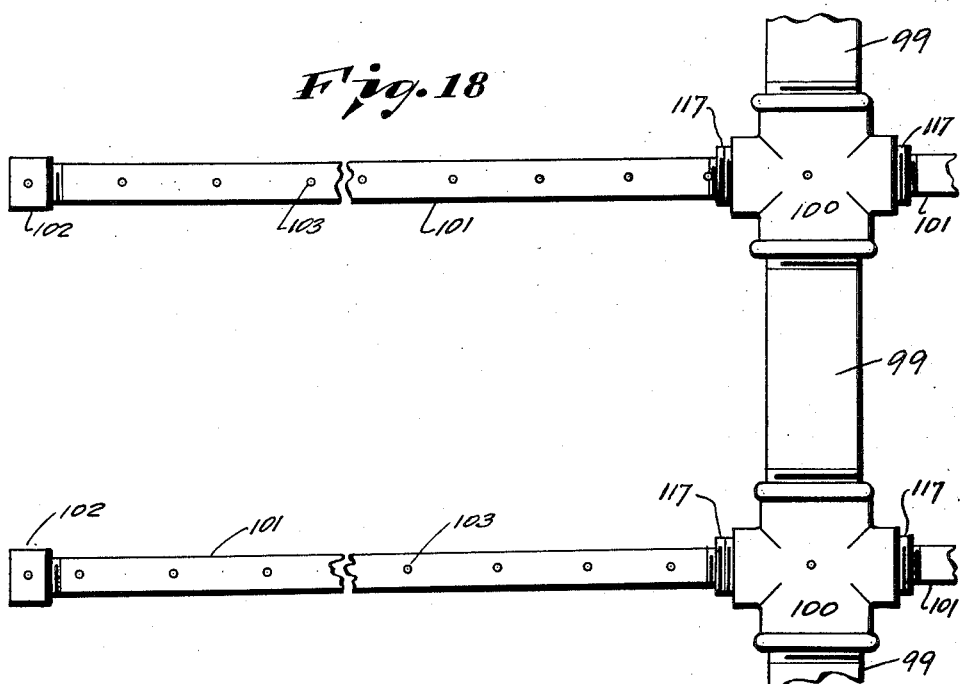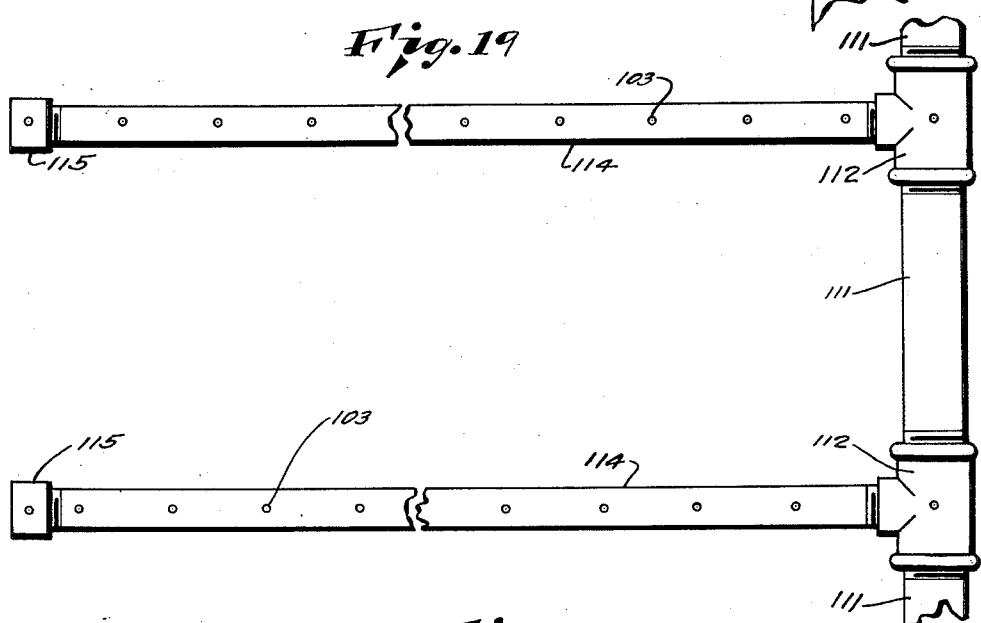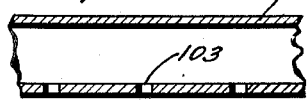

March 18, 1924.
H. M. WILLIAMS ET AL
WEED BURNER
Filed June 28, 1919  12 Sheets-Sheet 12
1,487,367
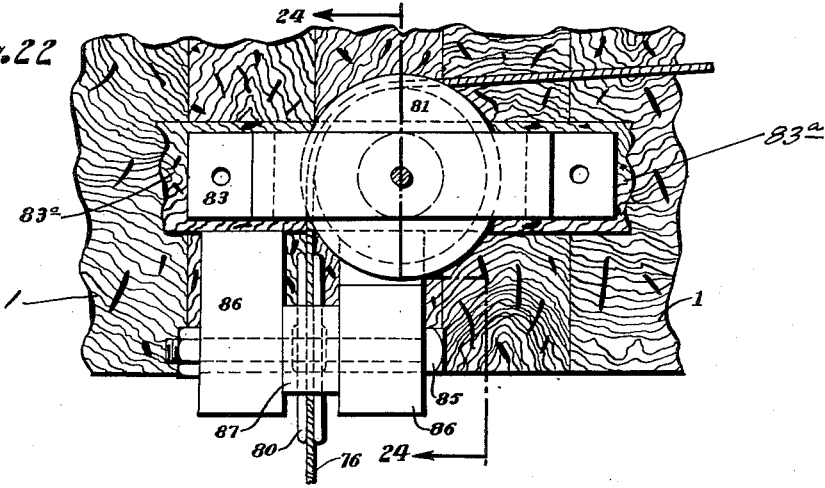
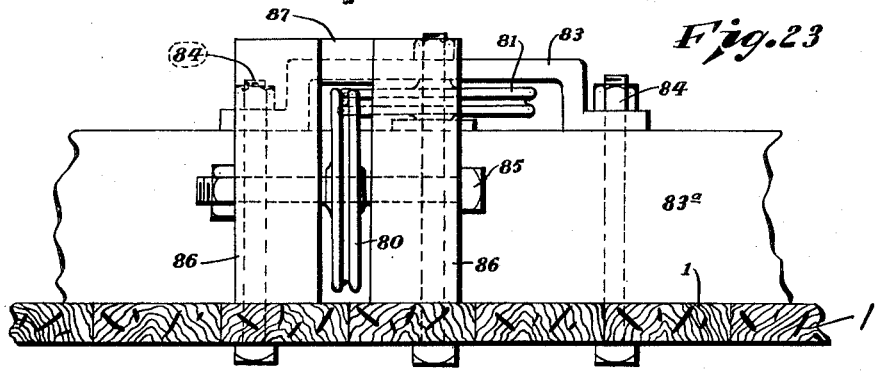
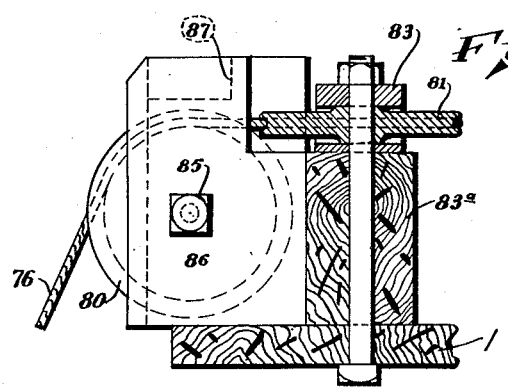
INVENTOR
Harry M. Williams
and John H. Dean
BY
Joshua R. H. Potts
ATTORNEY Patented Mar. 18, 1924.

1,487,367

UNITED STATES PATENT OFFICE.

HARRY M. WILLIAMS, OF LITTLE ROCK, AND JOHN W. DEAN, DECEASED, LATE OF LITTLE ROCK, ARKANSAS; BY RUTH L. DEAN, ADMINISTRATRIX, OF LITTLE ROCK, ARKANSAS.

WEED BURNER.

Application filed June 28, 1919. Serial No. 307,471.

*To all whom it may concern:*

Be it known that HARRY M. WILLIAMS, a citizen of the United States, residing at Little Rock, county of Pulaski, and State of Arkansas, and JOHN W. DEAN, deceased, late a citizen of the United States, and a resident of Little Rock, county of Pulaski, and State of Arkansas, have invented certain new and useful Improvements in Weed Burners, of which the following is a specification.

Our invention relates to a railroad weed burning device, and particularly to improvements in devices of this character such as disclosed in our Patent No. 1,238,861, granted September 4, 1917. An appliance of the character under consideration comprises a device arranged upon a suitable railway car and equipped with means through which it may be connected to a locomotive or other generator, whereby jets of steam or vapor may be directed downwardly upon the track and both sides of the same when desired to destroy weeds and vegetation, and also to melt ice and snow.

The primary object of our invention is to provide an improved and highly efficient device by means of which jets of saturate or superheated steam or vapor may be directed downwardly upon or adjacent the tracks for the purpose of destruction of vegetation or melting of ice and snow.

A further and particular object of our invention is to provide a device of the character mentioned which may be readily applied to any ordinary railroad flat or box car and which may be readily removed therefrom when desired without injury to said flat or box car.

A further object of our invention is to provide a device as mentioned comprising a burner located beneath the deck of a car and provided with means for raising and lowering the same, and means for supplying steam or vapor thereto from a generator.

Further objects of our invention are to provide a device of the character mentioned which shall be of simple construction, which shall be effective and reliable for performing the functions for which it is designed, and in which its several parts shall be comparatively few, of strong construction and not readily damaged in use. A further object of our invention is to provide a device as mentioned in which the cost of manipulation is substantially nil.

A further object of our invention is to provide a device of the class mentioned of improved construction whereby the maximum effect may be obtained from a given amount of steam projected from the burners.

With these objects in view, our invention consists generally of an ordinary flat or box car in combination with a burner arranged beneath the same, said burner including means for projecting downwardly a plurality of steam jets, and means for raising and lowering the burner as desired or found necessary.

Our invention further consists in a device as mentioned in which power operated mechanism is provided for normally raising and lowering the burner, in combination with manually operated means for operating the burner in emergencies.

Our invention further consists in a device as mentioned in which the burner is equipped with means for confining the heat and vapors within a restricted area, said means being of such construction and arrangement that it will not be injured by coming in contact with a road obstacle, as, for instance, a large rock, when the device is moving along the track with the burner in operative position.

Our invention further consists in a device as mentioned further equipped with insulating means on the burner to protect the woodwork of the car from injury.

Our invention further consists in a device as mentioned further characterized by such connections between the car and the burner as will not be injured by the swinging or rocking motion of the car.

Our invention further consists in various details of construction and arrangements of parts all as will be fully described hereinafter and particularly pointed out in the claims.

Our invention will be more readily understood by reference to the accompanying drawings forming a part of this specification, and in which—

Figure 1 is a side elevation of a railway flat car equipped with our invention in its preferred form.

Figure 2 is a detail side elevation of the end of the car adjacent the burner hoists, illustrated upon an enlarged scale.

Figure 4 is an enlarged view partly in end elevation and partly in section on line 4 of Figure 3, illustrating the burner in raised position.

Figure 5 is a similar view with the the burner in lowered position.

Figure 6 is a transverse sectional view of the lower portion of the device taken on the line 6—6 of Figure 1.

Figure 7 is a plan view of the portion of the device illustrated in Figure 2.

Figure 8 is a top plan view of the burner, portions being broken away.

Figure 9 is an enlarged sectional view on the line 9—9 of Figure 8, portions being broken away.

Figure 10 is an enlarged section on the line 10—10 of Figure 8.

Figure 11 is a detail side elevation of a portion of one of the devices employed for confining the steam within a restricted area.

Figure 12 is a perspective view of a hinge element.

Figure 13 is a perspective view of a hanger for the steam confining means.

Figure 18 is an enlarged detail bottom plan view of the main burner line pipe and its branches.

Figure 19 is a similar view of the sidewing distributing pipe and its branches.

Figure 20 is a detail, longitudinal section of one of the branch pipes.

Figure 21 is a section of the insulating means.

Figure 22 is an enlarged top plan view of a side wing hoisting sheaf and adjacent parts.

Figure 23 is a side elevation of the same, and

Figure 24 is a section on the line 24—24 of Figure 22.

Figure 3:
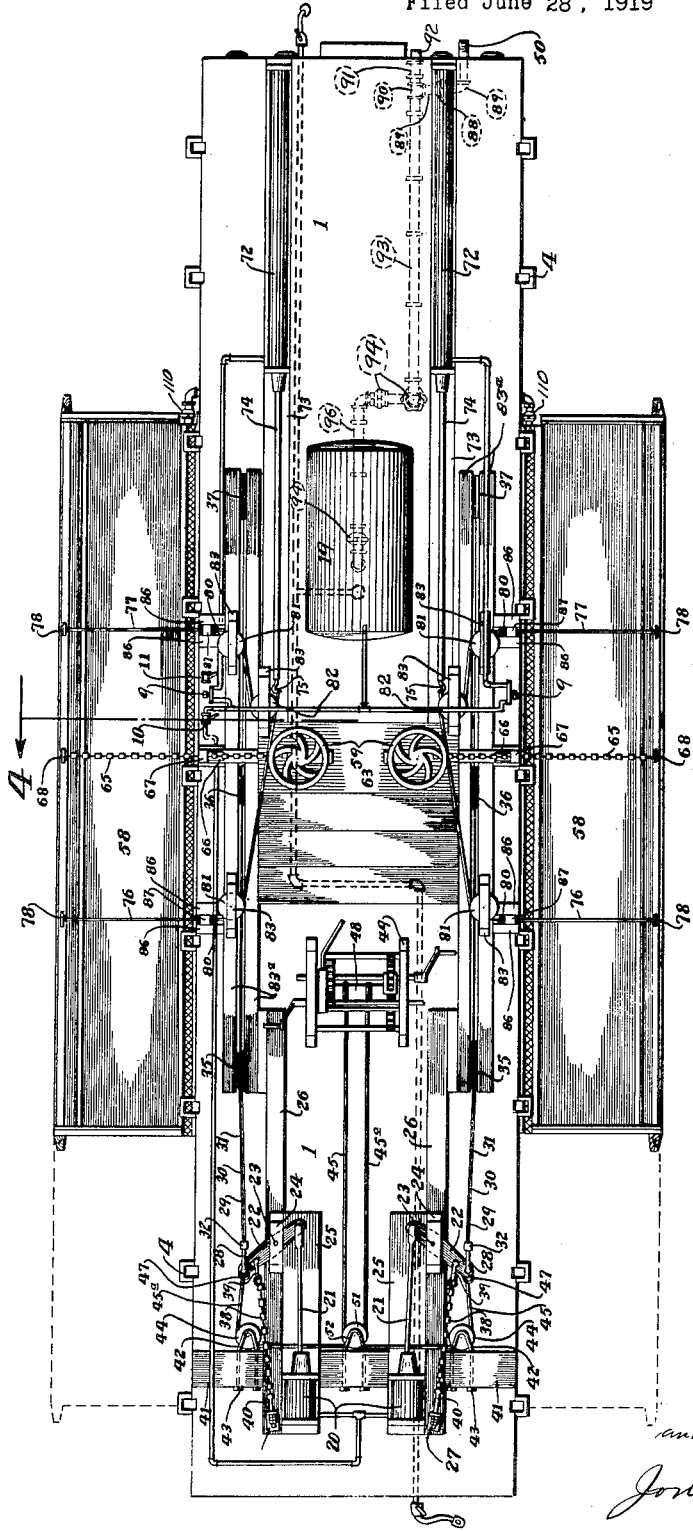
Figure 3 is a top plan view of the device illustrated in Figure 1, the roof being removed.

Referring now to the drawings, 1 indicates the body of an ordinary railway car known as a "flat" and mounted upon the usual wheels 57. If preferred, the car may be provided with the roof supporting members 2 and roof 3 for protection to the operators, and the mechanism on the car. The roof supporting members 2 are arranged in the usual stake pockets 4 and are held therein by anchor straps 5 secured in position by bolts 6 and 7. 8 indicates a hand rail secured to the members 2.

Arranged beneath the car 1 is the burner proper designated generally by the reference numeral 12. Safety chains 13, 14, 15 and 15ᵃ connect the burner to the car 1. The burner comprises the main central portion and the lateral wings 58 hingedly connected thereto, and suitable means are provided for raising and lowering both the body portion and the wings. To this end, hoisting ropes 29, 30 and 31 are provided for the body portion and ropes 76 and 77 and hand hoist chains 65 for the wings. Valves 9, 10 and 11 are supported in convenient position upon the car, preferably upon the hand rail 8 for controlling the mechanism for manipulating the device, the function of said valves being fully described hereinafter.

By manipulation of the valve 10, which is intermediately disposed in piping between the air reservoir 19 and the hoist cylinder 20, air is admitted to the hoist 20 which is normally fitted with the ordinary piston (not shown) and the piston rod 21, said piston rod 21 being pivotally connected to the lever 22 and of such length as to overcome the height of the arc described by the lever on its pivot 23, said lever 22 being pivotally connected to the bracket 24.

The cylinders 20 are preferably mounted on timbers 25, said timbers 25 being secured to the deck of the car 1. Adjacent to the timbers 25 are other timbers 26 which are also anchored to the deck of the car 1 and support the brackets 24 and 27. On the outside end of the lever 22 is pivotally connected thereto the link 28, which link, is connected to the ropes 29, 30 and 31 by rope clips 32; and, when air is admitted to the hoist cylinder 20, the push on the piston rod 21, which is connected to the lever hereinbefore described, operates the ropes 29, 30 and 31 to draw the complete burner 12 upwards until the timbers 33 abut the truss rods 34. The said rope 29 travels around the sheave 35, the rope 30 likewise over the sheave 36, and the rope 31 in a like manner over the sheave 37.

In the enlarged Figure 7 the illustration shows the position of the hoist piston rod 21 and the lever 22 when the complete burner 12 is in its raised position as shown in Figure 4. It is obvious that the air pressure will sometimes be low in the air reservoir 19 and therefore a safety device is needed so that in case the said pressure is low, this safety means will keep the burner from striking the rails, thus saving the expense of frequent repair and replacement of parts.

To this end, a safety chain 38 has been provided and is pivotally connected to the lever by the link 39, and on the opposite end of the said chain 38 is an eye-bolt 40 which is employed to take up the slack in the said chain. The eyebolt 40 being anchored to the bracket 27, the said bracket is therefore conveniently secured to the timbers 26.

On the outside of the timbers 26, timbers 41 are in a likewise manner secured to the deck of the car 1. The said timbers 41 having mounted thereon the mast sheave stands 42, which are secured thereto by the U bolts 43; and rotatably mounted in the said sheave stands 42, are the sheaves 44, which sheaves serve as guides for the ropes 45 45$^a$ respectively, each of said ropes being anchored at one end to pivot bolt 46 by a link 47, and the other end of each of the said ropes 45 and 45$^a$ being secured to the drum 48 of the hand winch 49. Therefore, should the air be of such pressure as to not be able to lift the burner 12, manipulation of the hand winch 49 is employed.

When the car is disconnected from its motive power or locomotive, there is no means for maintaining pressure in the tank 19. At such times the hand winch 49 is employed for raising and lowering the burner.

The two sheaves 51, are mounted in a similar manner to the sheaves 44, with this exception however, the mast stands 52 are made to accommodate two sheaves 51, the lower sheave serving as a guide for the rope 45 and the upper sheave serving as a guide for the rope 45$^a$.

Figure 14:
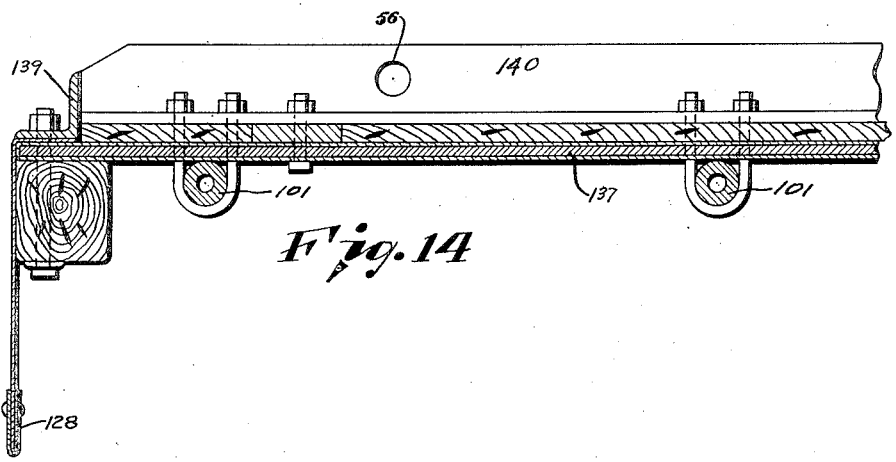
Figure 14 is a section on the line 14—14 of Figure 8.
Figure 15:
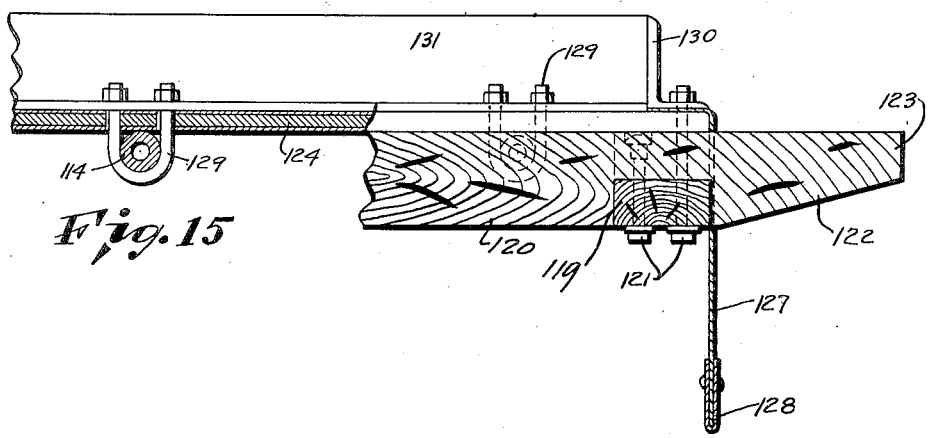
Figure 15 is an enlarged side elevation, partly in section, illustrating the method of splicing the side wings and parts adjacent thereto.

The ropes 29, 30 and 31 are attached to the burner 12 by eye-bolts 53, the said eye-bolts being anchored in the holes 54 (Figure 8) of the burner 12. The safety chains 14 are of such length that the mechanism of the burner 12 will not strike the rail, and the said chains 14 are secured to the timbers of the car by means of bolts 55 as shown in Figures 4 and 5 and attached to the burner by means of bolts 53. The safety chain 13 is secured to the timbers of the car, as are safety chains 14, and is conveniently secured to the burner by means of an ordinary chain link, the said chain link protruding through the hole 56 of the angles 140 (Figure 14).

The function of the said chain 13 is to keep the burner clear of the wheels 57, thus saving the inconvenience of injury to the said burner which might strike the said wheels.

When the car is on the road it is obvious that the side wings 58 must be raised to clear cattle guards, yard gates, etc., as shown in Figure 4, and to raise and lower the said wings 58, respective air hoists and hand hoists have been employed. Each hand hoist consists of an ordinary brake wheel 59 fixed to an ordinary brake staff 60, supported by brackets 61 and 62, the said brackets being mounted upon timbers 63 and the said timbers 63 being secured to the deck of the car 1.

On the lower end of the brake staff 60 there is attached thereto an ordinary brake pawl and ratchet as indicated by the numeral 64, the said brake pawl and ratchet serving as a locking means and safety device so that the wings may be held in any desired position.

Fixedly secured to the staff 60 is an ordinary chain 65, which chain 65 rides over the sheave 66, the said sheave being mounted in a bracket 67, the said bracket 67 being conveniently mounted on the deck of the car 1, as illustrated in Figures 3, 4 and 5. The other end of the chain 65 is secured in an eye-bolt 68, the said eye-bolt fitting through the hole 69 of the side wing 58 (Figure 8). The two brake wheels 59 have a second locking means other than the pawls and ratchets 64, and this means as is employed in the present invention is an ordinary chain 70 with hooks 71 on either end, the said hooks and chain connecting the wheels 59. The hereinbefore stated means of raising each of the side wings is employed when the air pressure is low or the car is disconnected from the locomotive as hereinbefore stated and another means of raising and lowering the wings 58 is through the manipulation of the valves 9, the said valves 9 being located between the air reservoir 19 and the respective air hoists 72.

The air hoists 72 are conveniently secured to timbers 73 and the timbers 73 are secured to the deck of the car 1. By the manipulation of one of the valves 9, air is admitted into the respective hoist 72 and the push or pull on the rod 74 operates the side wing as hereinbefore described in the description of the hand hoisting means. The end of the rod 74 has secured thereto a hook 75 and attached to the hook 75 are the ropes 76 and 77, and the other ends of the ropes 76 and 77 are secured to eye-bolts 78, the said eye-bolts 78 are mounted in the holes 79 of the side wings 58 (Figure 8). The ropes 76 and 77 are guided over the sheaves 80, 81 and 82, the sheaves 82 are rotatably mounted in brackets 83, and, as shown in Figures 22, 23 and 24, the sheaves 80 and 81 are thus mounted; the sheave 81 is rotatably mounted in a bracket 83, the said bracket being secured to the timber 83$^a$ and the deck of the car 11 by the bolts 84 and the sheave 80 is rotatably mounted on the bolt 85, the said bolt 85 being secured within the timbers 86, the said timbers conveniently attached to the deck of the car 1.

In case the rope 76 has a tendency to jump off, a rope guard 87 is employed and located between the timbers 86.

An ordinary superheated or saturated locomotive having pipes conveniently connected to the steam chest and brought down so as to easily and accessibly be connected to the pipe 50 by an ordinary coupling, may be employed, but is not shown in the drawings.

To take up the rocking motion which is well known between two railroad cars, steam joints 88 are employed and attached by a suitable pipe connection 89. The steam joint 88 is connected to a T 90, and pipe cap 92 extends outwardly from the car for any convenient distance as may be desired.

The other end of the T 90 has protruding therefrom a pipe 93 which is suitably connected as shown by other steam joints 94. The said steam joints 94 and pipes 95 and 96 being suitably connected between the car and the burner so that any rocking motion may be taken up between the said car and the said burner, when the apparatus is in operation.

The steam, in its predetermined path passing through the pipe 50, to and through the suitable connections as hereinbefore described, to and through the vertical pipe 95, which pipe 95 is screwed into T 97, enters into the main feed pipe 98 of the burner 12.

All exposed piping is asbestos covered so as to lose but a small percentage of the pressure when it reaches the T 97. The T 97 is connected to the main feed line 98 of the burner 12. The said main feed is composed of nipples 99 and crosses 100, the said crosses 100 having projected therefrom small pipes 101 each of which has a cap 102 on its outer extremity.

Referring now more particularly to Figure 18, the steam is exhausted through small apertures 103, the said apertures being located and staggered along the pipes 101 as shown. At the right-hand side of Figure 8 and protruding from the cross 104 is a nipple 105, which is screwed into the T 106, and extending from each side of the T 106, is a pipe 107 which is connected to the said T by means of bushings 108.

Each of the pipes 107 is cut to provide a space for a valve 109, the function of the said valve is to shut off the steam from the corresponding side wing in case a stretch of roadway is barren while the other side is densely vegetated.

The valves 109 may be opened according to the side on which the vegetation is most dense, or if between rails is most densely vegetated and it is not necessary to destroy the vegetation on the outside of the rails, both valves 109 may be closed to confine all the steam to the main burner.

Conveniently attached to the pipes 107 are the steam joints 110, the said joints 110 being of such construction as is well known to those skilled in the art, to be able to rotate the wings 58.

Connected to the joints 110 are the respective main pipes 111 of the side wings 58, each of the said feed pipes 111 being composed of T's 112 with nipples 113, therebetween, and extending outwardly from the T's 112 are small pipes 114 having caps 115 at the outer extremity.

Referring now more particularly to Figure 19, the pipes 114 are drilled in a similar manner to pipes 101, to provide openings through which the steam escapes, as indicated by the numeral 103.

To the end that pipes 101 may be conveniently detached from the respective crosses 100, a suitable space is left between each cap 102 and the adjacent T 112 as indicated by the numeral 116, and as constant wear upon the threads of the pipe 101 may injure the cross 100, a suitable bushing 117 is, therefore, employed. A space 118 is also left between caps 115 and timbers 120 for disconnecting the pipes 114.

The side wings 58 are composed of timbers 119 which are spliced to timbers 120 and held together by bolts 121, and each of the timbers 120 is so shaped at the ends as indicated at 122, as to be able to cam off any small obstacle that may abut the end 123 and thus damage the frame-work of the side wing.

Mounted upon the timbers 119 and 120 is a slab 124, a section of which is illustrated in Figure 21; the said slab is of a fibrous material as indicated by the numeral 125, and the said fiber is enclosed by sheet metal, as indicated by the numeral 126.

This slab is a means by which the heat from the steam may be kept away from the woodwork of the car and also to confine the heat as close to the ground as possible, and other means of confining the steam in an enclosure consists of a flexible fabric curtain 127 having weights 128, the function of the said weights is to keep the curtain 127 taut and also should the occasion so require, the weights 128 are dragged along the ground; therefore saving the curtain 127 from extensive wear.

The pipes 114 are held to this slab by means of U bolts 129. Reenforcing members of the side wings are composed of side angles 130, longitudinal angles 131, and strap irons 132 and 133, the function of the said strap irons is to more firmly secure the curtains 127 and 134.

The curtain 134 is composed of asbestos woven cloth as indicated by the numeral 135 and canvas cloth as indicated by the numeral 136. The wings 58 are hingedly connected to the main burner slab 137 by means of hinge straps 138 which are secured to the body or slab 137 and embrace the pipe 111. By this construction the pipes for the wings constitute the hinge for the same.

A clearer illustration of the hinge straps 138 may be seen by referring to Figure 12, the same being a mere piece of bent strap iron.

The main burner slab is reenforced in a similar manner to the hinged wing 58 by means of side angles 139, longitudinal angles 140, longitudinal straps 141 and timbers 142.

The two-fold function of the said timbers 142 is to reenforce the slab 137 and to abut the truss rods 34 of the car 1, the latter to save the burner from injury. Other reenforcing angles are indicated by the numeral 143 and the flat strap 144, the said straps 144 are used in a similar manner as straps 142 and 143. The strap 133 is secured to the timbers 120 by means of bolts 145 and the straps 132 are secured to the slab 124 by means of U bolts 146 which U bolts 146 aid in holding pipes 114 in position.

The strap 144 is set upon a wood filler 147, the said filler 147 providing space in which the hinge 138 protrudes, and the same strap 144 is secured to the slab 137 by means of bolts 148. In a likewise manner to the strap 144, the angles 143 are blocked up by means of wood fillers 146 providing space for the hereinbefore stated hinge.

The pipes 101 are held against the slab 137 by means of U bolts 149, the said U-bolts 149 binding the pipes 101, slab 137, wood filler 147 and the angles 143 together. Mounted upon the main feed pipe 111 of each of the wings 58 is a hanger 150 which supports a metal curtain 151, the function of the said curtain 151 is to confine the steam under the main burner when the side wings are shut off as hereinbefore described and a clearer illustration in side elevation of the hangers 150 and the metal curtains 151 may be seen in Figure 11.

The curtain 151 is secured to the hanger by means of bolts 152. The side curtain of the burner complete is generally indicated by the numeral 127 and the end curtains by the numeral 153, the said curtains 153 are cut away around the rails as indicated in Figure 9, by the aperture 154. The said cutting away also necessitates the cutting away of the timbers 155 which reenforce the main burner.

At the center of the car, and at the point where the side wings 58 are hinged, the curtains 153 are so cut as to lap over one another so as to insure as little escape of steam as possible and the said curtains are also cut away, forming an aperture 156 to provide space so the main feed pipe 99 may protrude therethrough.

The metal weights 128 are attached to the fabric curtains 153 by means of rivets 157. Each of the safety chains 15ª is secured to the timbers 158 of the car as illustrated in Figure 6 by means of bolt 159 and attached to the burner by means of a U-strap 160 which supports the burner at the center.

Figure 17:
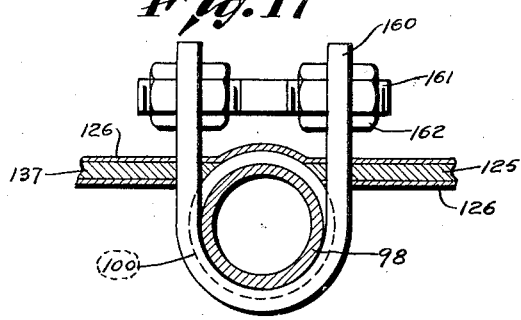
Figure 17 is a section on the line 17—17 of Figure 8.

The said strap 160 is attached to the main feed pipe 98 as illustrated in Figure 17 there being a stud 161 conveniently secured to the U-strap 160 by means of nuts 162 and the stud 161 is conveniently attached to the chain 15ª by means of a chain link or other suitable connections.

The main burner slab 137 as indicated in Figure 17 has an asbestos filler 125 and a sheet metal enclosure 126. The said slab 137 is cut as shown in the aforesaid figure to provide clearance for the crosses 100.

Figure 16:
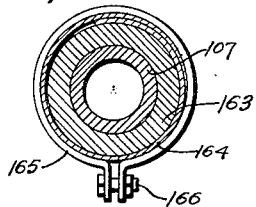
Figure 16 is a section on the line 16—16 of Figure 8.

The pipes 107 are asbestos covered as indicated in Figure 16 by the numeral 163 and the asbestos 163 is wrapped with sheet metal 164 to provide a guard for the said asbestos 163 in case of abutting the wheels, rails or road obstacles and the said sheet metal 164 is held in place by means of a clamp 165 secured by means of bolts 166.

The valves 9 are located intermediately between the hoist cylinders 72 and the air reservoir 19, the valve 10 is located between the cylinders 20 and the air reservoir 19 and a valve 11 is an ordinary train line emergency valve, the advantage of which is well known to those experienced in the art to which the aforesaid appertains.

We claim:—

1. A device of the class described comprising a car, a burner arranged beneath said car and comprising a central body portion, side wings hingedly connected thereto, means on said body portion and said wings for projecting jets of heated fluid downwardly therefrom, power means for raising and lowering said burner bodily, and manually operable means for raising and lowering the burner, substantially as described.

2. A device as set forth in claim 1 further characterized by means for raising and lowering the wings independently of the body portion of the burner, substantially as described.

3. A device as set forth in claim 1 in combination with power operated means for raising and lowering the wings independently of the body of the burner, and manually operable means for raising and lowering the wings, substantially as described.

4. A device as set forth in claim 1 in combination with safety chains limiting the longitudinal swing of the burner, substantially as described.

5. In a device of the class described, a railway car, a burner mounted beneath said car comprising a body portion and laterally extending wings hingedly connected thereto, means on said body portion and wings for projecting jets of heated fluid downwardly therefrom, flexible elements attached to said body portion for raising and lowering said burner, said elements comprising the supporting means for the burner, a heated fluid pipe on said car, and a flexible connection between said pipe and said burner, whereby said burner is free to swing when an obstruction is encountered, substantially as described.

6. In a device of the class described, a railway car, a burner mounted beneath the same, means on said burner for projecting downwardly jets of heated fluid, a lever pivotally mounted intermediate its ends on said car, a flexible connection between one end of said lever and said burner, and power operated means connected to the other end of said lever for actuating the same to raise and lower said burner, substantially as described.

7. A device as set forth in claim 6 in combination with means for holding said lever in burner raising position, substantially as described.

8. A device as set forth in claim 6 in combination with a flexible element connected to the opposite end of said lever from said power mechanism, and means for manually actuating the last said flexible element to raise and lower said burner, substantially as described.

9. A device of the class described, a burner comprising a body and side wings hingedly connected thereto, means for projecting jets of heated fluid downwardly from said body and wings, depending means at the forward, rear and lateral edges of said body and at the forward, rear and outer edges of said wings for confining the heated fluid beneath said burner, and means for shutting off the supply of heated fluid from said wings, substantially as described.

10. A device as set forth in claim 9, in combination with means for raising and lowering said wings independently of said body, substantially as described.

11. A device as set forth in claim 9, in which said depending means consists of flexible curtains and weights fixed to the lower edges of said curtains, substantially as described.

12. In a device of the class described, a body portion and lateral wings, a heated fluid pipe extending longitudinally of said body and provided with a plurality of lateral extensions, a pair of distributing pipes extending laterally from said heated fluid pipe, a pair of heated fluid pipes mounted to oscillate on said body portion adjacent the edges thereof and in swiveled connection with said distributor pipes, and a plurality of outwardly extending pipes fixed to the last-mentioned pipes and secured to said wings, whereby said pipes form hinged connections between the body and the wings of the burner, means on all of said outwardly and laterally extending pipes for projecting downwardly jets of heated fluid, and means for raising and lowering said wings, substantially as described.

In testimony whereof we have signed our names to this specification in the presence of two subscribing witnesses.

HARRY M. WILLIAMS.
RUTH L. DEAN,
*Administratrix of the estate of John L. Dean, deceased.*

Witnesses for Harry M. Williams:
 E. B. KINSWORTH,
 G. D. HENDERSON.
Witnesses for Ruth L. Dean:
 SOPHIA M. HEASLEY,
 G. D. DAVIS.